(No Model.)  2 Sheets—Sheet 1.

R. GALLOWAY.
FERTILIZER DISTRIBUTER.

No. 496,560. Patented May 2, 1893.

Witnesses:
J. M. Fowler Jr.
Aly J. Stewart

Inventor:
Robert Galloway
By Church & Church
his Attorneys (No Model.) 2 Sheets—Sheet 2.
R. GALLOWAY.
FERTILIZER DISTRIBUTER.
No. 496,560. Patented May 2, 1893.
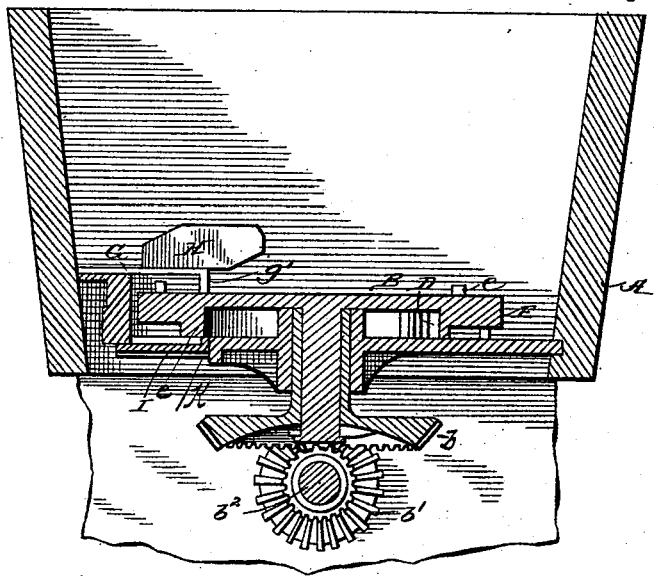
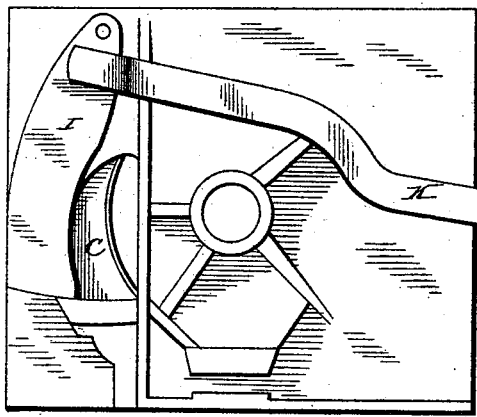
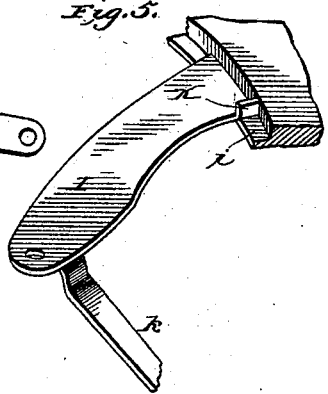
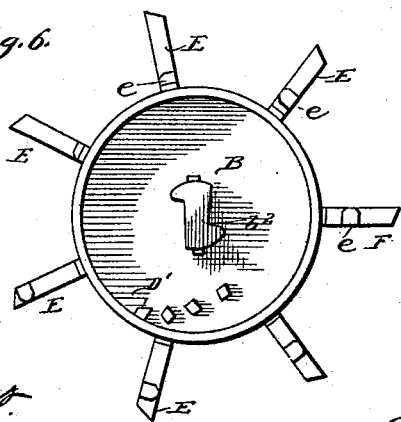
Witnesses:
J. M. Fowler Jr.
Aly J. Stewart
Inventor:
Robert Galloway
By Church & Church
his Attorneys

UNITED STATES PATENT OFFICE.

ROBERT GALLOWAY, OF MACEDON, NEW YORK.

FERTILIZER-DISTRIBUTER.

SPECIFICATION forming part of Letters Patent No. 496,560, dated May 2, 1893.

Application filed December 10, 1892. Serial No. 454,759. (No model.)

*To all whom it may concern:*

Be it known that I, ROBERT GALLOWAY, of Macedon, in the county of Wayne and State of New York, have invented certain new and useful Improvements in Fertilizer-Distributers; and I do hereby declare the following to be a full, clear, and exact description of the same, reference being had to the accompanying drawings, forming a part of this specification, and to the letters of reference marked thereon.

This invention relates to the devices for distributing fertilizer, and more especially to that class of fertilizer distributers used in connection with grain drills, the object of the invention being to provide a mechanism which will insure a regular feed of fertilizer when set to feed at any desired rate from the greatest to the least capacity of the machine, a further object being to simplify and improve the mechanical elements whereby the parts are kept clean and free from accumulations of fertilizer which would tend to prevent the perfect operation of the distributer.

Primarily, the invention consists in an improved form of feed wheel having feeding fingers with vertical projections thereon, the projections on the respective fingers being arranged spirally or located different distances from the center of rotation.

Further, the invention consists in certain novel details of construction and combinations and arrangements of parts all as will be now described and pointed out particularly in the appended claims.

Figure 1:
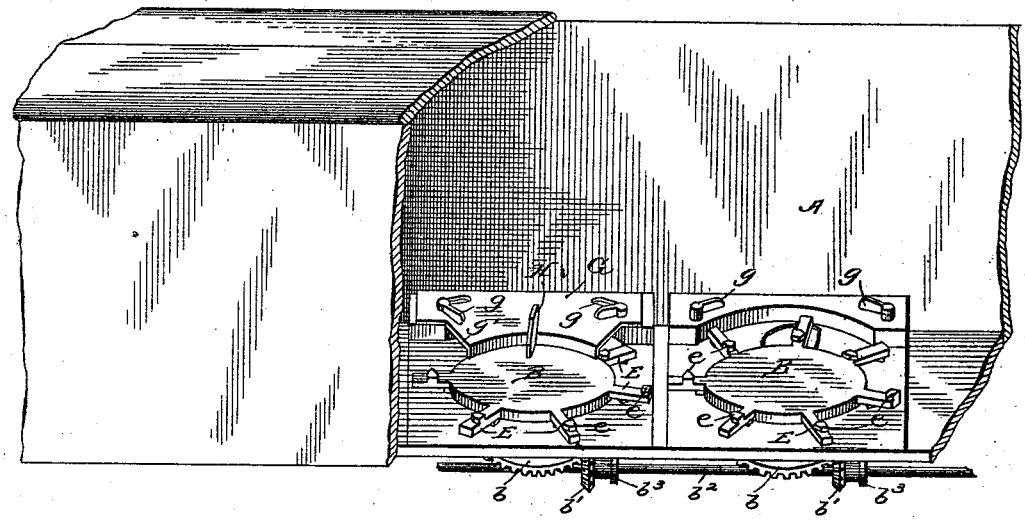
Figure 2:
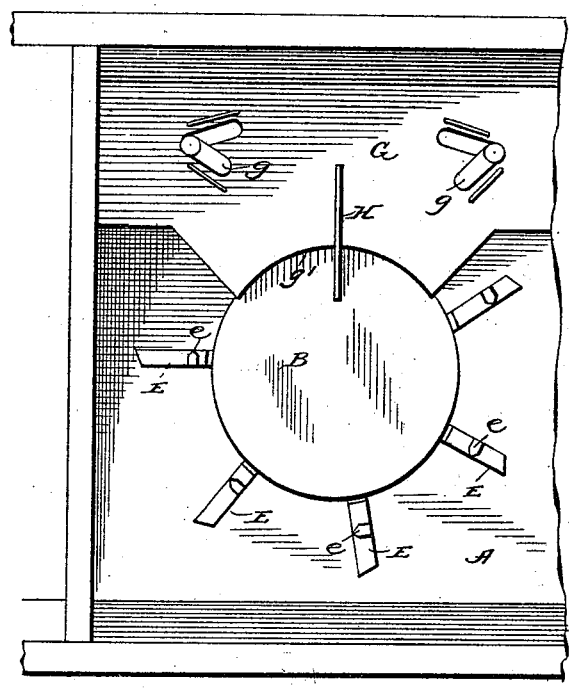

Referring to the accompanying drawings: Figure 1 is a perspective view looking into the hopper of a fertilizer distributer constructed in accordance with my present invention, with portions broken away. Fig. 2 is a top plan of one of the distributer wheels and base plate. Fig. 3 is a tranverse section through the same. Fig. 4 is a bottom plan view. Fig. 5 is a detail perspective of the cut-off. Fig. 6 is a bottom plan of the feed wheel.

Similar letters of reference in the several figures indicate the same parts.

The hopper lettered A in the drawings may be of any desired or preferred kind, and as usual in this class of mechanism the feed wheels are located in or on the bottom of the hopper or base plate, with the driving mechanism therefor on the outside below such bottom.

In carrying the present invention into practice, horizontal feed wheels are employed, designated by the letter B and each is driven through bevel gear wheels $b$ $b'$ carried respectively by the downwardly projecting stems of the feed wheels, and the horizontal drive shaft $b^2$ journaled in hangers $b^3$ below the hopper and receiving its motion from the drive wheels in the usual manner.

The hopper bottom or base plate is provided with a large elongated feed opening C having one end wider than the other one side of the opening preferably being concentric to the other and eccentric to the periphery of the wheel for a purpose which will presently appear. The opening also, preferably extends under the edge of the feed wheel to allow any fertilizer which works beneath the same to escape, this result being insured by locating a diagonal or eccentric scraper on the under side of the wheel, the tendency of which is to work the fertilizer toward the periphery. This diagonal or eccentric scraper in the preferred form is composed of a series of projections D formed directly on the under side of the wheel with their faces arranged to cover or pass over a wide section of the bottom of the hopper and successively move any fertilizer thereon toward the periphery of the wheel, and the last projection lettered D' has its face at substantially right angles to the direction of movement so as to carry the fertilizer around to the feed opening where it drops away from the wheel. The feed wheels are each provided with a series of radial feed fingers E projecting from their peripheries and adapted to sweep across the feed opening, and in order to prevent the caking and sticking or clogging of the fertilizer either above or below the wheel, which has been found to be a serious difficulty with this class of distributer, I now provide each finger with a small projection $e$ located a distance from the center of rotation different from the projections on the other fingers, or in other words the projections are spirally arranged and each projection travels in a path of its own. I preferably make the sum of the projections equal the length of one finger, hence, in each revolution of the wheel, the entire mass of fertilizer adjacent the teeth is worked over and cut up, but at the same time there are not so many teeth as to cause the mass to cake and choke above the fingers. The projections are preferably placed on both the top and bottom of the fingers, keeping the working surface of the base plate clear, and are arranged successively from the base to the ends of the fingers, so as to tend to work the fertilizer outward.

A housing or cut off plate G is removably secured over the feed opening by turn buttons g or otherwise, the top of such housing being elevated some distance above the tops of the projections on the fingers. The inner edge of the housing extends down in proximity to the central disk of the wheel and at the entrance side is provided with a flange g' which reduces the size of the opening and just permits the projections to pass beneath it, while the exit end is open clear to the top of the housing, thereby insuring the escape of all fertilizer which works beneath the housing and which does not pass out through the feed opening. The housing may be further provided with a central wing H to prevent the mass of material above the wheel from turning therewith and assist in causing the same to drop down between the fingers properly, as will be readily understood. In order now to regulate to a nicety the quantity of fertilizer fed through the feed opening, and at the same time to insure the regular feed of the same, no matter how much passes in a given time with the wheel turning at a given rate, I provide a cut-off or gate I pivotally connected to the under side of the hopper bottom and adapted to close said opening by moving across it at substantially right angles to its greatest length. In the form of opening shown, the cut-off moves in from the outer corner, and has its advanced edge curved to conform to the circumference of the wheel, whereby as it moves inward, the shape of the opening left, conforms to the curvature of the wheel and is long but narrow, thus offering the minimum resistance to the passage of fertilizer and insuring a regular feed for any sized opening. Inasmuch as the opening extends beneath the periphery of the central or disk portion of the wheel, the fertilizer after passing the edge of the cut-off, at once falls clear and is guided and deposited in the earth in the usual manner.

The cut-off is provided with an operating arm K which may be connected with any suitable and ordinary operating mechanism for simultaneously moving all the cut-offs in the machine. At the forward edge it rests on a guide way i on the hopper bottom and to insure the clearing of this guide way and also the edge of the opening, the cut-off is provided with a small upwardly projecting wing or flange k at the extreme end, which, sweeping over the guide way removes all accumulations therefrom.

With a fertilizer distributer constructed in accordance with the foregoing description it will be found that a free and regular feed may be maintained with any adjustment of the cut-off and because of the simplicity of the parts not only is the initial cost very low, but the whole device may be separated and cleaned with the utmost facility.

Having thus described my invention, what I claim as new is—

1. In a fertilizer distributer, the combination with the base plate having the feed opening therein and the housing over the same, of the feed wheel having the radial fingers and the projections on the fingers located at varying distances from the center of rotation whereby they agitate different portions of the mass of fertilizer; substantially as described.

2. In a fertilizer distributer, the combination with the base plate having the feed opening therein and the housing over the same, of the feed wheel having the radial fingers and the spirally arranged projections on the fingers; substantially as described.

3. In a fertilizer distributer, the combination with the base plate having the feed opening therein and the housing over said opening, of the horizontal feed wheel having the radial feed fingers and the spirally arranged feed projections on the top and bottom of said fingers; substantially as described.

4. In a fertilizer distributer, the combination with the base plate having the feed opening therein, of the horizontal feed wheel having the central disk portion extending over said opening and the diagonally arranged scraper on the under side of the disk portion for removing the fertilizer working under the disk; substantially as described.

5. In a fertilizer distributer, the combination with the horizontal feed wheel and the base plate having the elongated feed opening therein, of the cut-off pivoted to the base plate and working across said feed opening at substantially right angles to its greatest length and having its advance edge curved to conform to the circumference of the wheel; substantially as described.

6. In a fertilizer distributer, the combination with the horizontal feed wheel having the central disk portion and the base plate having the elongated feed opening extending beneath the said disk portion, of the cut-off having its advance edge curved to conform to the circumference of said disk portion and working across the opening at substantially right angles to its greatest length; substantially as described.

7. In a fertilizer distributer, the combination with the base plate having the feed opening and guiding flange and the feed wheel, of the cut-off pivoted to the base plate and resting on the guiding flange, of the projection or flange on the end of the cut-off for removing accumulations from the edge of the opening and guiding flange; substantially as described.

8. In a fertilizer distributer, the combination with the base plate having the feed opening therein and the feed wheel having the central disk and radial fingers and projections extending upwardly from said fingers, of the housing over said opening having the flange extending down to the central disk portion of the wheel, the reduced opening through which the fingers and projections enter the housing and the large opening through which they emerge; substantially as described.

ROBERT GALLOWAY.

Witnesses:
ISAAC DEAN,
WALTER E. RATHBUN.